US008336223B2

(12) United States Patent
Nakayama et al.

(10) Patent No.: US 8,336,223 B2
(45) Date of Patent: Dec. 25, 2012

(54) ROUNDNESS MEASURING APPARATUS

(75) Inventors: Tatsuki Nakayama, Kure (JP); Hideki Shindo, Kure (JP)

(73) Assignee: Mitutoyo Corporation, Kawasaki-shi (JP)

( * ) Notice: Subject to any disclaimer, the term of this patent is extended or adjusted under 35 U.S.C. 154(b) by 270 days.

(21) Appl. No.: 12/784,779

(22) Filed: May 21, 2010

(65) Prior Publication Data

US 2010/0293800 A1 Nov. 25, 2010

(30) Foreign Application Priority Data

May 22, 2009 (JP) ................................. 2009-124037

(51) Int. Cl.
*G01B 5/004* (2006.01)
(52) U.S. Cl. ................. 33/550; 33/503; 33/553; 33/557
(58) Field of Classification Search ............ 33/550–551, 33/553–554, 556–557, 502–503, 560; 73/1.79; 702/167
See application file for complete search history.

(56) References Cited

U.S. PATENT DOCUMENTS

| 4,658,509 | A | * | 4/1987 | Juengel | 33/558 |
| 5,028,901 | A | * | 7/1991 | Enderle et al. | 358/1.18 |
| 5,056,235 | A | * | 10/1991 | Thomas | 33/503 |
| 5,150,529 | A | * | 9/1992 | Collingwood | 33/503 |
| 5,251,156 | A | * | 10/1993 | Heier et al. | 702/167 |
| 5,404,649 | A | * | 4/1995 | Hajdukiewicz et al. | 33/503 |
| 6,430,828 | B1 | * | 8/2002 | Ulbrich | 33/503 |
| 6,543,150 | B2 | * | 4/2003 | Matsumiya et al. | 33/553 |
| 6,772,527 | B1 | * | 8/2004 | Butter et al. | 33/503 |
| 6,886,264 | B2 | * | 5/2005 | Sakata et al. | 33/502 |
| 7,024,333 | B2 | * | 4/2006 | Rogele et al. | 702/155 |
| 7,096,077 | B2 | * | 8/2006 | Price et al. | 700/66 |
| 7,665,219 | B2 | * | 2/2010 | Styles et al. | 33/503 |

FOREIGN PATENT DOCUMENTS

JP 2004-233131 8/2004

* cited by examiner

*Primary Examiner* — R. A. Smith
*Assistant Examiner* — Tania C Courson
(74) *Attorney, Agent, or Firm* — Rankin, Hill & Clark LLP

(57) ABSTRACT

A roundness measuring apparatus includes a stylus stocker and a controller. The stylus stocker stores plural types of styli prepared corresponding to shapes of measurement sites of a measurement target object. The stylus stocker can store styli in such a manner that each stylus can be held thereon and taken out thereof. The stylus stocker is provided outside a measurement region, which is determined on the basis of the operation range of a turntable and a detector driving mechanism. The detector driving mechanism can move the detector to the outside of the measurement region. When a measurement command is given, the controller carries out roundness measurement of the object while controlling the turntable and the detector driving mechanism. When a stylus replacement command is given, the controller carries out stylus replacement operation between a detector main unit and the stylus stocker while controlling the detector driving mechanism.

11 Claims, 8 Drawing Sheets

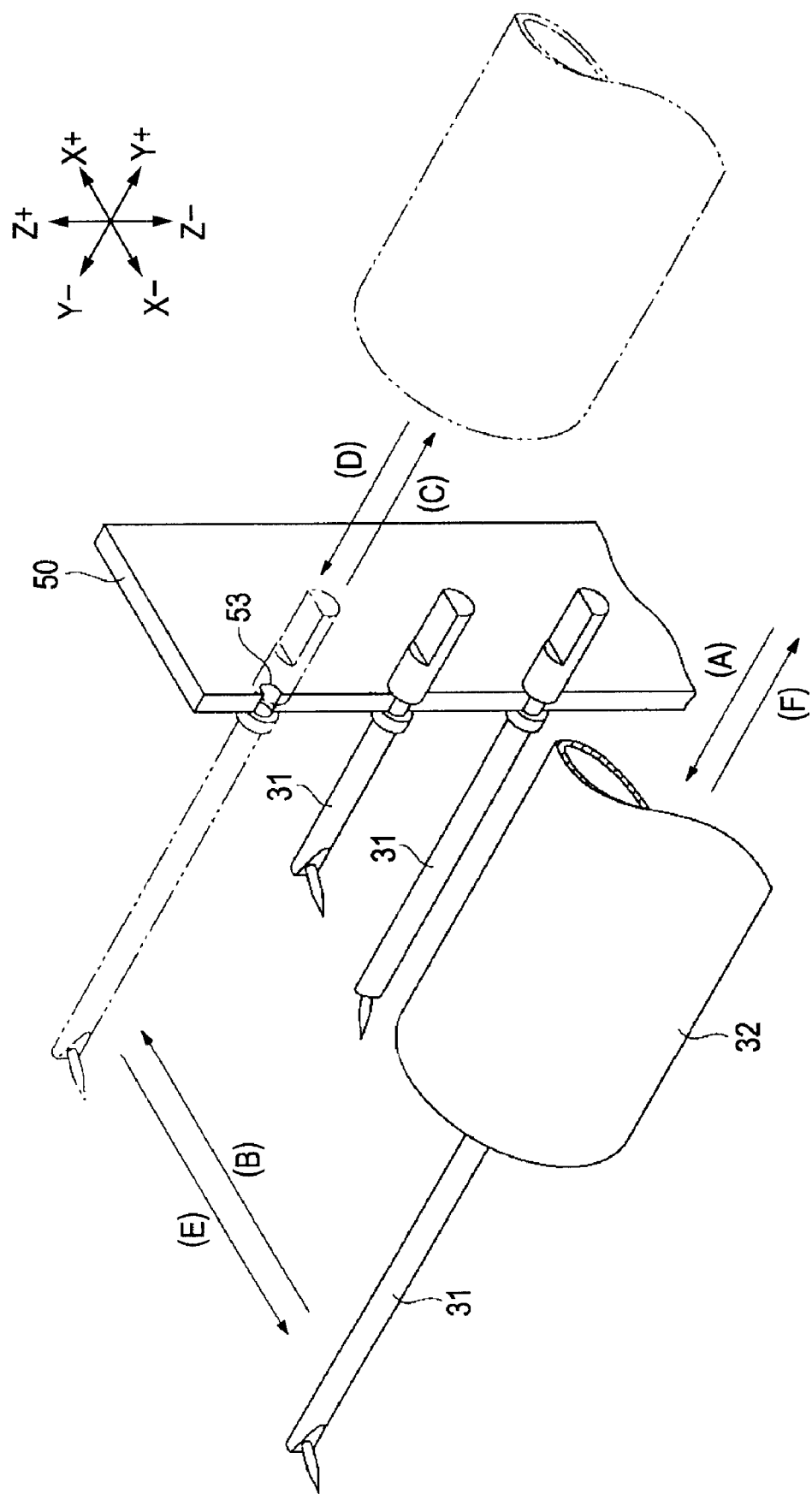

ROUNDNESS MEASURING APPARATUS

BACKGROUND OF THE INVENTION

1. Field of the Invention

The present invention relates to a roundness measuring apparatus. In particular, the invention relates to a roundness measuring apparatus that is capable of changing a stylus automatically.

2. Description of the Related Art

A roundness measuring apparatus is known as an instrument for measuring the roundness of a measurement target object. A roundness measuring apparatus is provided with a base, a turntable, a column, an elevation slider, a sliding arm, and a detector. The turntable is provided on the base. The turntable can rotate around a vertical axis. A measurement target object is placed on the upper surface of the turntable. The column stands on the base. The elevation slider can move upward and downward along the column. The sliding arm is provided on the elevation slider. The sliding arm can slide in the direction orthogonal to the vertical axis. The detector is mounted at the tip of the sliding arm. The detector detects the displacement of a stylus, which is brought into contact with the measurement target object, and outputs the detected stylus displacement in the form of an electric signal. An example of such a roundness measuring apparatus of related art is disclosed in Japanese Unexamined Patent Application Publication No. 2004-233131.

A roundness measuring apparatus typically comes with a plurality of styli having various shapes, which are designed to fit various shapes of measurement sites (e.g., parts or regions) of a measurement target object. Therefore, when a user uses a roundness measuring apparatus for measurement, they replace its stylus with one that is appropriately suited for the shape of a measurement site of a measurement target object before measurement. For example, when the roundness of a deep hole of a measurement target object is measured, they replace its stylus with a deep-hole stylus, which has a great stylus length, before measurement. When roundness inside a groove is measured, they replace its stylus with a groove stylus and then carry out measurement. In the related art, a person who carries out measurement changes a stylus. For stylus replacement, a person who carries out measurement has to stop measurement work. After removing a stylus that is currently in use from a detector, he or she attaches a different stylus to the detector. Then, he or she resumes measurement work.

In such stylus replacement of the related art, it is necessary for a person who carries out measurement to stop measurement work and manually remove a current stylus from a detector and manually attach a different stylus to the detector. Therefore, it involves considerable downtime in measurement work, that is, a long time period throughout which measurement work has to be stopped. In addition, the burden of manual stylus removal and attachment that is placed on the person who carries out measurement is not light. A conceivable solution to the above problem is to apply an automatic probe changer, which is used in the field of a three-dimensional measuring apparatus and the like, to a roundness measuring apparatus. That is, it is conceivable to provide a stylus stock unit that stores plural types of styli on a roundness measuring apparatus.

However, if a stylus stock unit that stores plural types of styli is provided on a roundness measuring apparatus, a measurement region will be very restricted because it is necessary to provide the stylus stock unit over a turntable, which constitutes the measurement region.

SUMMARY OF THE INVENTION

An advantage of some aspects of the invention is to provide a roundness measuring apparatus that is capable of changing a stylus automatically without restriction on a measurement region.

A roundness measuring apparatus according to an aspect of the invention includes a base, a turntable, a detector, a detector driving mechanism, a stylus stocker, and a control unit. The turntable can rotate around a vertical axis. A measurement target object is placed on an upper surface of the turntable. The detector includes a stylus and a detector main unit. The stylus is brought into contact with the measurement target object. The stylus is detachably attached to the detector main unit. The detector main unit detects displacement of the stylus and outputs the detected stylus displacement in the form of an electric signal. The detector driving mechanism drives the detector so as to move the detector in a direction of the vertical axis and in a direction orthogonal to the vertical axis toward and away from the turntable. The stylus stocker stores plural types of styli, which are prepared corresponding to shapes of measurement sites of the measurement target object. The stylus stocker is able to store the styli in such a manner that each stylus can be held on the stylus stocker and taken out of the stylus stocker. The stylus stocker is provided outside a measurement region, which is determined on the basis of an operation range of the turntable and the detector driving mechanism. The detector driving mechanism is configured to be able to move the detector to the outside of the measurement region. When a measurement command is given, the control unit carries out measurement of roundness of the measurement target object while controlling operation of the turntable and the detector driving mechanism. When a stylus replacement command is given, the control unit carries out stylus replacement operation between the detector main unit and the stylus stocker while controlling operation of the detector driving mechanism.

With such a configuration, when a measurement command is given, the detector driving mechanism performs driving operation to bring the stylus of the detector into contact with the measurement target object. The turntable is driven for rotation in a state in which the stylus is in contact with the measurement target object. By this means, measurement of the roundness, or the like, of the measurement target object is carried out. When a stylus replacement command is given, the detector driving mechanism performs driving operation to carry out stylus replacement operation between the detector main unit and the stylus stocker. Therefore, if it is programmed that a stylus replacement command should be issued depending on the shape of a measurement site of the measurement target object, stylus replacement operation is carried out automatically between the detector main unit and the stylus stocker, which makes it possible to conduct measurement work continuously without interruption. Thus, a burden placed on a person who carries out measurement can be reduced. In addition, it is possible to increase the efficiency of measurement work. The stylus stocker is provided outside the measurement region, which is determined on the basis of the operation range of the turntable and the detector driving mechanism. In addition, the detector driving mechanism is configured to be able to move the detector to the outside of the measurement region. Therefore, the stylus stocker does not impose limitations on the measurement region.

In the configuration of a roundness measuring apparatus according to the above aspect of the invention, it is preferable that the detector driving mechanism should include a column that is provided on the base, an elevation driving mechanism that drives an elevation slider so as to move the elevation slider upward and downward along the column, a first slide driving mechanism that drives a sliding arm so as to move the sliding arm in the direction orthogonal to the vertical axis toward and away from the turntable with respect to the elevation slider, a second slide driving mechanism that is provided at the tip of the sliding arm and causes the detector to slide in a direction orthogonal to a sliding axis of the sliding arm, and a swiveling drive mechanism that causes the second slide driving mechanism to move in a swiveling direction with the sliding axis of the sliding arm being the center of the swiveling movement of the second slide driving mechanism; and the detector can be moved to the outside of the measurement region through the operation of the second slide driving mechanism and the swiveling drive mechanism.

In such a preferred configuration, the detector driving mechanism includes the second slide driving mechanism, which is provided at the tip of the sliding arm and applies a driving force to the detector so as to slide the detector in the direction orthogonal to the sliding axis of the sliding arm, and the swiveling drive mechanism, which moves the second slide driving mechanism in a swiveling direction with the sliding axis of the sliding arm being the center of the swiveling movement of the second slide driving mechanism. The swiveling drive mechanism performs driving operation to turn the second slide driving mechanism by ninety degrees around the sliding axis of the sliding arm, thereby putting the detector into a horizontal position first. Thereafter, the second slide driving mechanism performs driving operation to slide the detector in the direction orthogonal to the sliding axis of the sliding arm. As a result, the detector is moved to the position of the stylus stocker, which is provided outside the measurement region. Therefore, the detector has access to the stylus stocker provided outside the measurement region with a comparatively simple configuration without obstructing roundness measurement operation.

In the above configuration of a roundness measuring apparatus, it is preferable that the stylus stocker should be provided at a position between the turntable and the column near, or relatively close to, the back of the base behind the sliding axis of the sliding arm. In such a preferred configuration, the stylus stocker is provided at a position between the turntable and the column near, or relatively close to, the back of the base behind the sliding axis of the sliding arm. The sliding axis of the sliding arm is positioned between the stylus stocker and the front of the base. Therefore, the view of a person who carries out measurement, which is taken from the front of the base, is not blocked thereby. For this reason, he or she can conduct measurement work while observing the work.

In the above configuration of a roundness measuring apparatus, it is preferable that the swiveling drive mechanism can change a position of the detector within an angular range from negative ninety degrees to positive ninety degrees; and, in said angular range, an erect position of the detector at which the stylus is oriented in an upright direction is taken as zero degree. In such a preferred configuration, the position of the detector can be changed within an angular range from negative ninety degrees to positive ninety degrees. In this angular range, the erect position of the detector at which the stylus is oriented in the upright direction is taken as zero degree. Therefore, for example, if it is configured that stylus replacement operation is carried out when the detector is in the positive ninety-degree position, it is possible to carry out measurement of the roundness of the measurement target object when the detector is in the negative ninety-degree position. Thus, it is possible to carry out measurement while appropriately changing the angular position of the detector depending on the shape of a measurement target object.

BRIEF DESCRIPTION OF THE DRAWINGS

FIG. 8 is a perspective view that schematically illustrates an example of stylus replacement operation according to an exemplary embodiment of the invention.

DESCRIPTION OF THE PREFERRED EMBODIMENTS Configuration of Roundness Measuring Apparatus FIG. 2 is a plan view that schematically illustrates an example of the configuration of the roundness measuring apparatus. As illustrated in these drawings, a roundness measuring apparatus according to the present embodiment of the invention is provided with a base 10, a turntable (i.e., turntable) 20, a detector 30, a detector driving mechanism 40, a stylus stock unit 50, and a control unit 60. The turntable 20 is provided on the base 10 at one side thereof. The turntable 20 can rotate around a vertical axis L. A measurement target object (e.g., work piece) W is placed on the upper surface of the turntable 20. The detector driving mechanism 40 applies a driving force to the detector 30. When driven by the detector driving mechanism 40, the detector 30 moves in the direction of the vertical axis L and in the direction orthogonal to the vertical axis L toward and away from the turntable 20. The stylus stock unit 50 stores plural types of styli, which are prepared corresponding to shapes of measurement sites of the measurement target object W. These styli can be stored in the stylus stock unit 50 when not in use and taken out of the stylus stock unit 50 for use.

Figure 6:
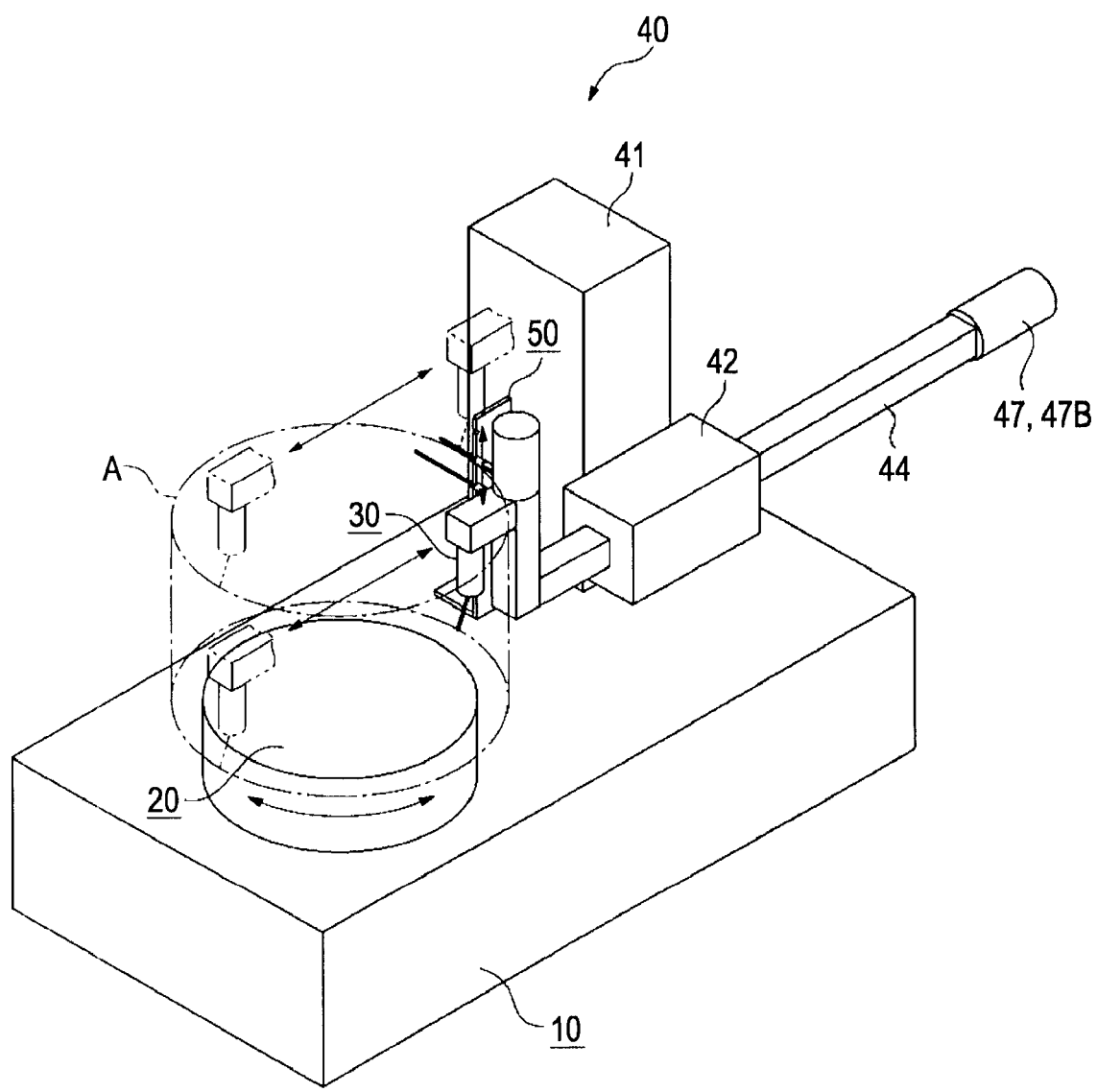
FIG. 6 is a perspective view that schematically illustrates an example of a measurement region according to an exemplary embodiment of the invention.

A turntable driving mechanism, which is not illustrated in these drawings, is provided inside the base 10. The turntable 20 rotates around the vertical axis L when driven by the turntable driving mechanism (refer to FIG. 6). The turntable driving mechanism (21) includes a motor that rotates the turntable 20, a power transmission mechanism that transmits the power of the motor to the turntable 20 through a decelerator, and/or the like.

Figure 3:
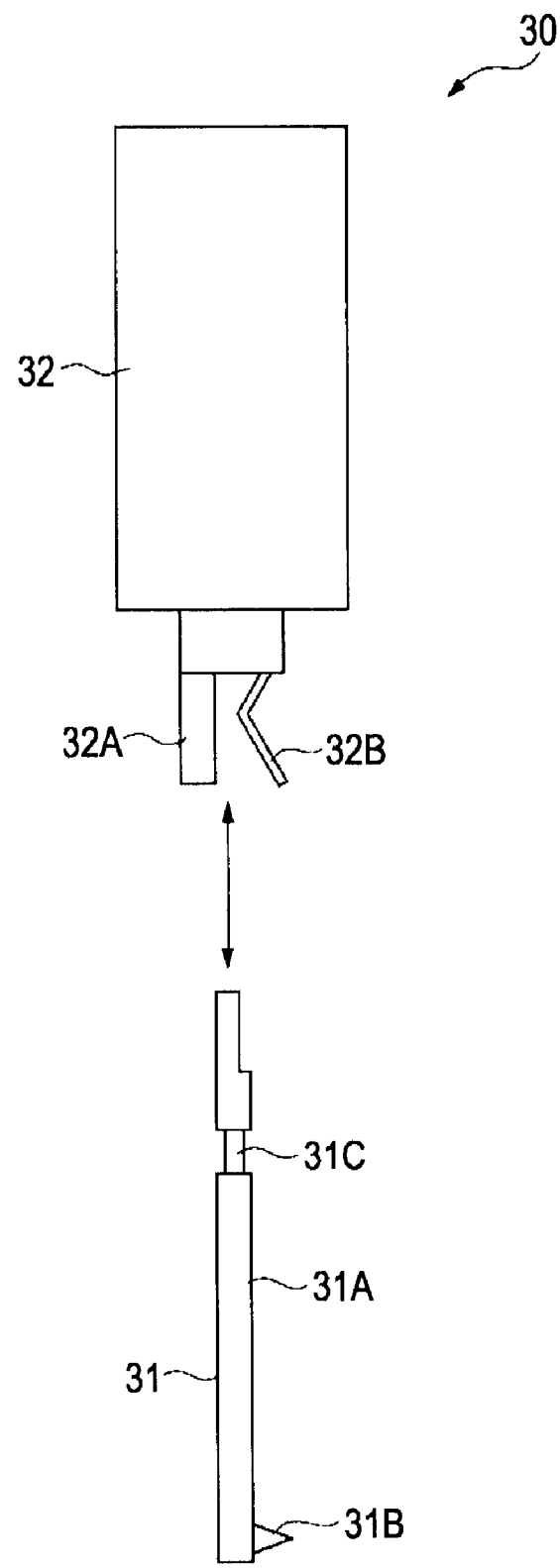
FIG. 3 is a diagram that schematically illustrates an example of the configuration of a detector main unit and a stylus according to an exemplary embodiment of the invention.

As illustrated in FIG. 3, the detector 30 includes a stylus 31 and a detector main unit 32. The stylus 31 is brought into contact with the measurement target object W. The stylus 31 is detachably attached to the detector main unit 32. The detector main unit 32 detects the displacement of the stylus 31 (i.e., displacement in the direction orthogonal to the direction of the length of the stylus 31) and outputs the detected stylus displacement in the form of an electric signal. The stylus 31 includes a stylus main body 31A, a sensing pin 31B, and a hookable neck portion 31C. The stylus main body 31A has a predetermined length. The sensing pin 31B is fixed to the tip of the stylus main body 31A. The hookable neck portion 31C is formed as a recess at the base portion of the stylus main body 31A. A supporting piece member 32A and a flat spring 32B are provided on the detector main unit 32. The supporting piece member 32A and the flat spring 32B are provided opposite to each other with a certain clearance therebetween. The base portion of the stylus 31 is inserted at the gap between the supporting piece member 32A and the flat spring 32B in a removable manner, which means that the stylus 31 is detachably attached to the detector main unit 32.

The detector driving mechanism 40 includes a column 41, an elevation driving mechanism 43, a first slide driving mechanism 45, a second slide driving mechanism 46, and a swiveling drive mechanism 47. The column 41 is provided on the base 10 at the other side thereof. The elevation driving mechanism 43 applies a driving force to an elevation slider 42. When driven by the elevation driving mechanism 43, the elevation slider 42 moves upward and downward (i.e., in the Z direction) along the column 41. The first slide driving mechanism 45 applies a driving force to a sliding arm 44 so as to move the sliding arm 44 in the direction orthogonal to the vertical axis L toward and away from the turntable 20 (i.e., in the X direction) with respect to the elevation slider 42. The second slide driving mechanism 46 is provided at the tip of the sliding arm 44. The second slide driving mechanism 46 applies a driving force to the detector 30 so as to slide the detector 30 in the direction orthogonal to the sliding axis of the sliding arm 44. The swiveling drive mechanism 47 moves the second slide driving mechanism 46 in a swiveling direction. The sliding axis of the sliding arm 44 is the center of the swiveling movement of the second slide driving mechanism 46.

Though not specifically illustrated in the drawings, the elevation driving mechanism 43 may have any structure as long as it can move the elevation slider 42 upward and downward. For example, the elevation driving mechanism 43 may be configured as a feed mechanism that includes a ball screw shaft that is provided upright inside the column 41, a motor that causes the ball screw shaft to rotate, and a nut member that is threadably mounted on the ball screw shaft and connected to the elevation slider 42. In addition, though not specifically illustrated in the drawings, the first slide driving mechanism 45 may have any structure as long as it can move the sliding arm 44 in the direction orthogonal to the vertical axis L toward and away from the turntable 20. For example, the first slide driving mechanism 45 may be configured as follows. A rack is provided along the direction of the length of the sliding arm 44. A pinion that runs in mesh with the rack, a motor that causes the pinion to rotate, and the like are provided inside the elevation slider 42.

Figure 4:
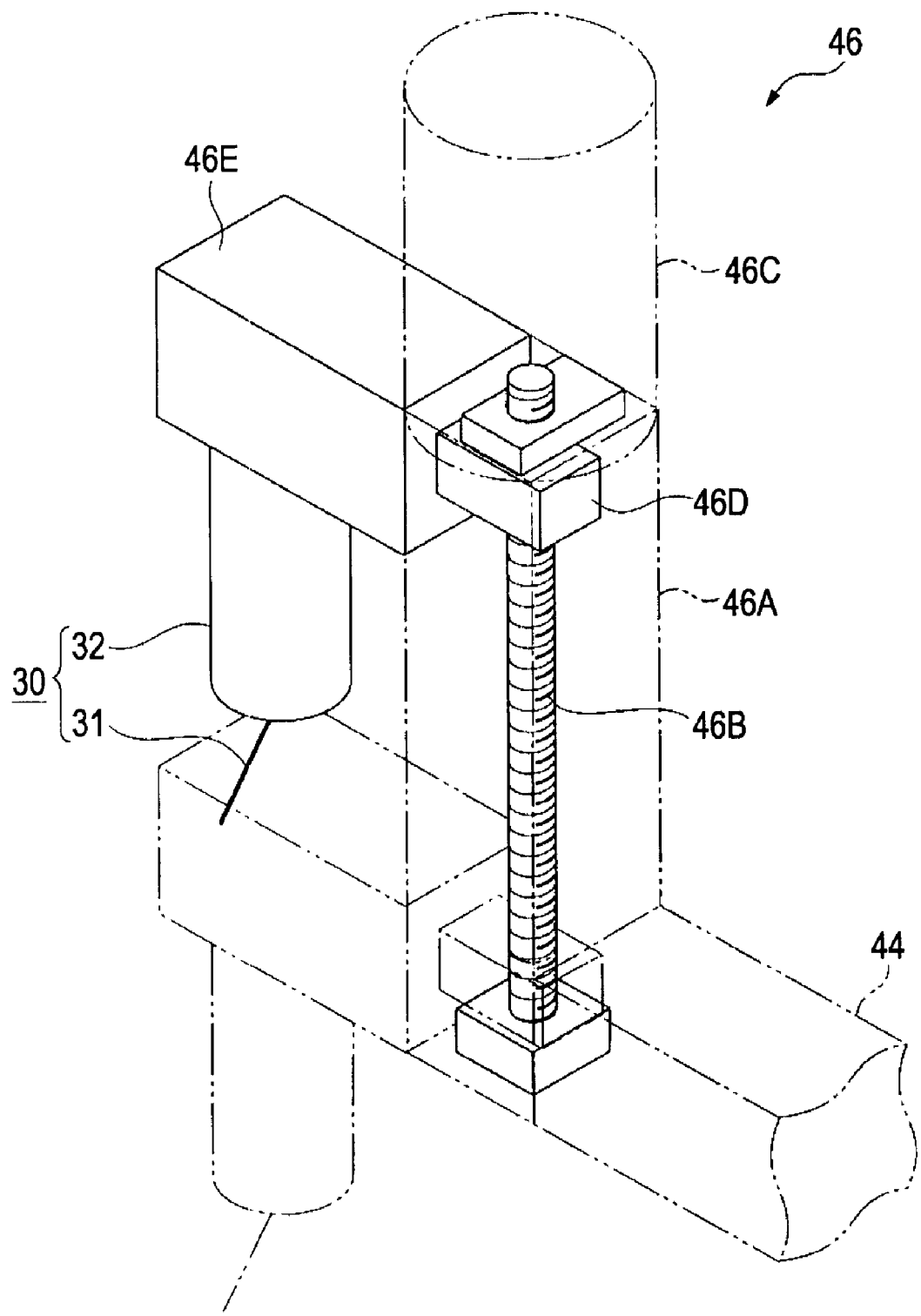
FIG. 4 is a perspective view that schematically illustrates an example of the configuration of a second slide driving mechanism according to an exemplary embodiment of the invention.

As illustrated in FIG. 4, the second slide driving mechanism 46 is configured as a feed mechanism that includes a casing member 46A, a ball screw shaft 46B, a motor 46C, a nut member 46D, and a detector holding portion 46E. The casing member 46A is fixed to the tip of the sliding arm 44. The casing member 46A forms a right angle with the sliding arm 44. The ball screw shaft 46B is provided inside the casing member 46A as a rotatable shaft. The motor 46C causes the ball screw shaft 46B to rotate. The nut member 46D is threadably mounted on the ball screw shaft 46B. The detector holding portion 46E, which is fixed to the nut member 46D, holds the detector 30. Note that the structure of the second slide driving mechanism 46 is not limited to an example shown in FIG. 4.

Figure 5:
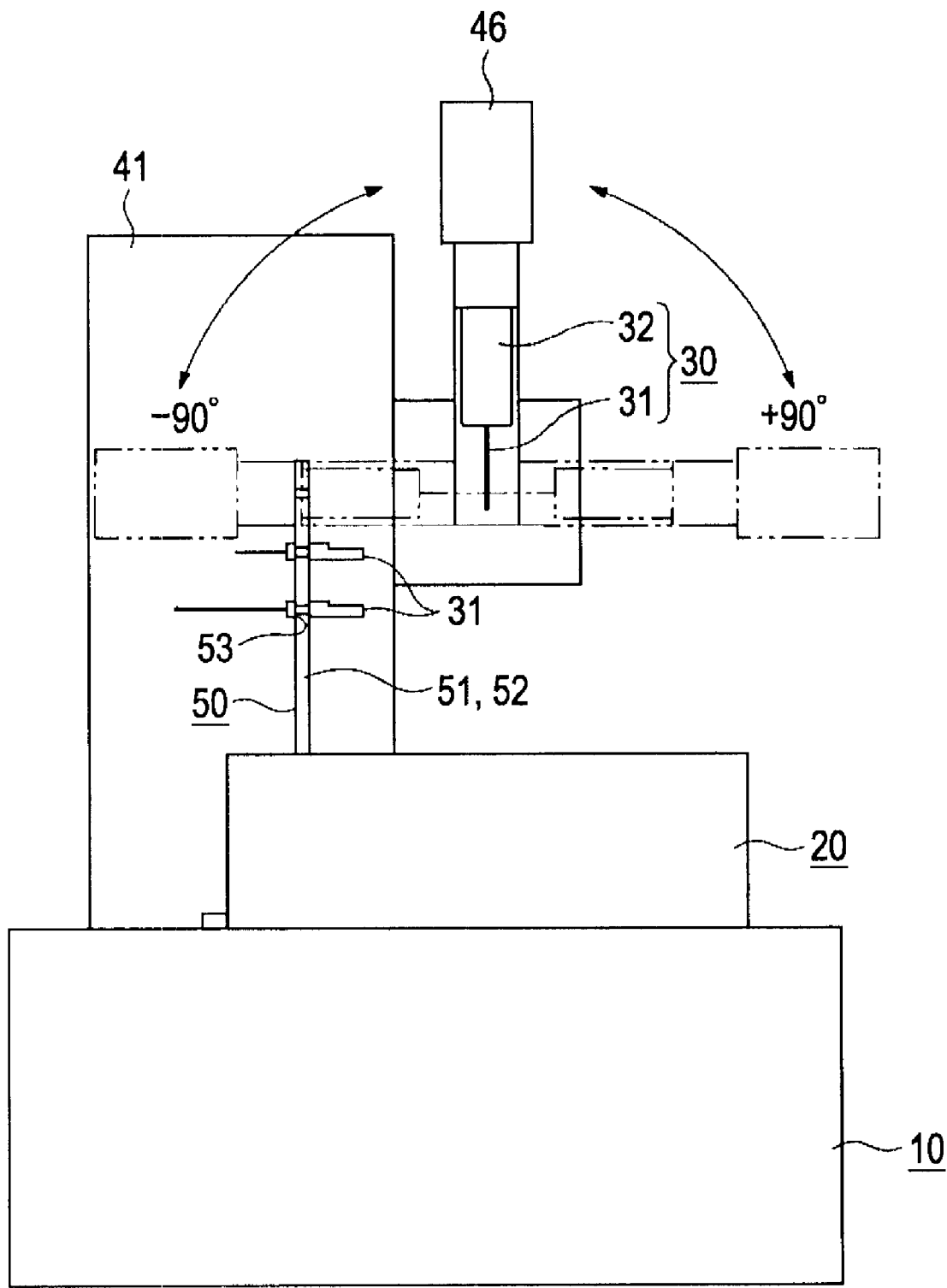
FIG. 5 is a diagram that schematically illustrates an example of the operation of a swiveling drive mechanism according to an exemplary embodiment of the invention.

The swiveling drive mechanism 47 includes a swiveling shaft, which is not illustrated in the drawings, and a motor 47B. The swiveling shaft is provided inside the sliding arm 44 as a rotatable shaft. The tip of the swiveling shaft is connected to the casing member 46A of the second slide driving mechanism 46. The motor 47B is provided at the base end of the swiveling shaft. The motor 47B drives the swiveling shaft for swiveling operation. In the present embodiment of the invention, as illustrated in FIG. 5, the position (i.e., orientation) of the detector 30 can be changed within an angular range from −90° to +90°. In this angular range, the erect position of the detector 30 at which the stylus 31 is oriented in the upright direction is taken as 0°.

Figure 1:
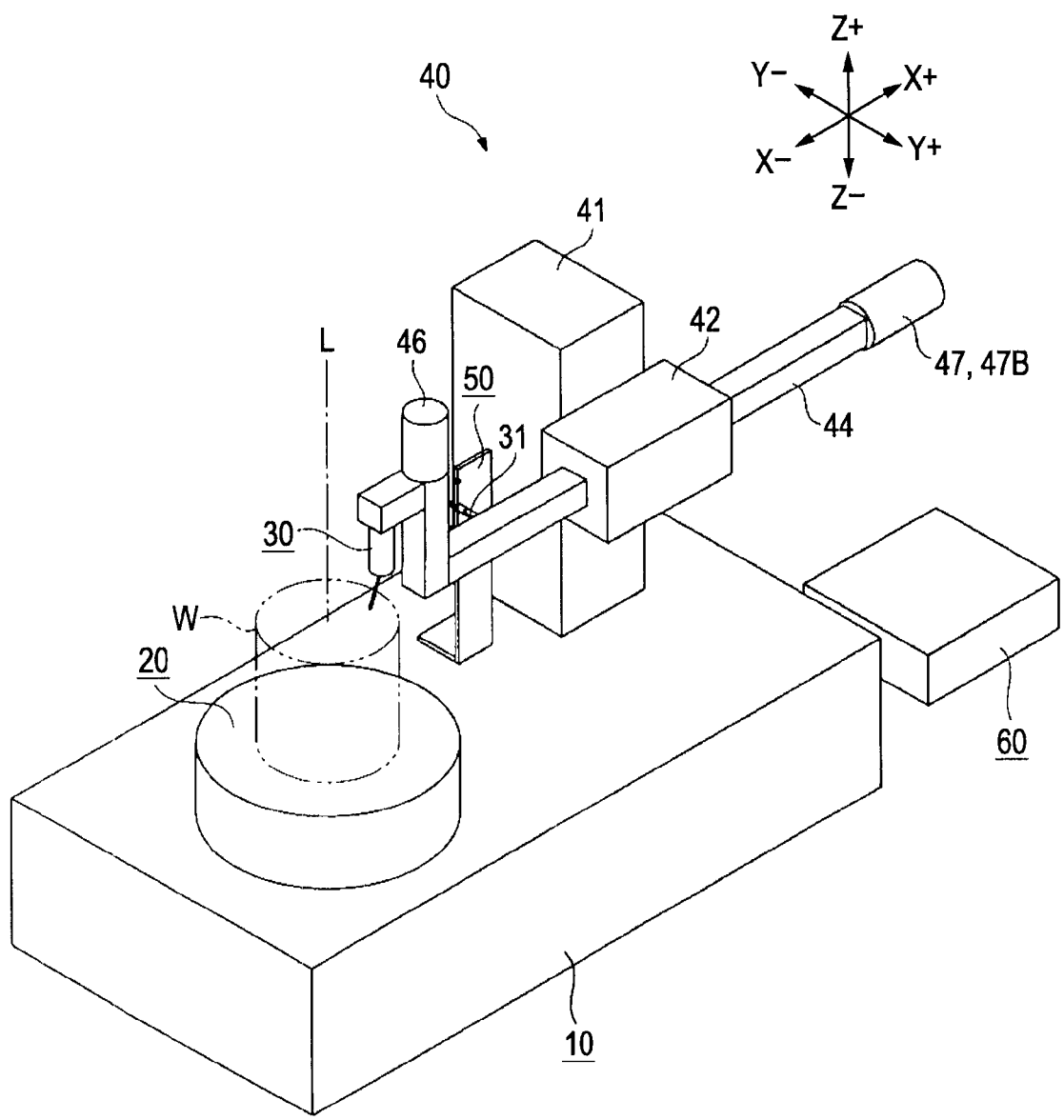
FIG. 1 is a perspective view that schematically illustrates an example of the configuration of a roundness measuring apparatus according to an exemplary embodiment of the invention.
Figure 2:
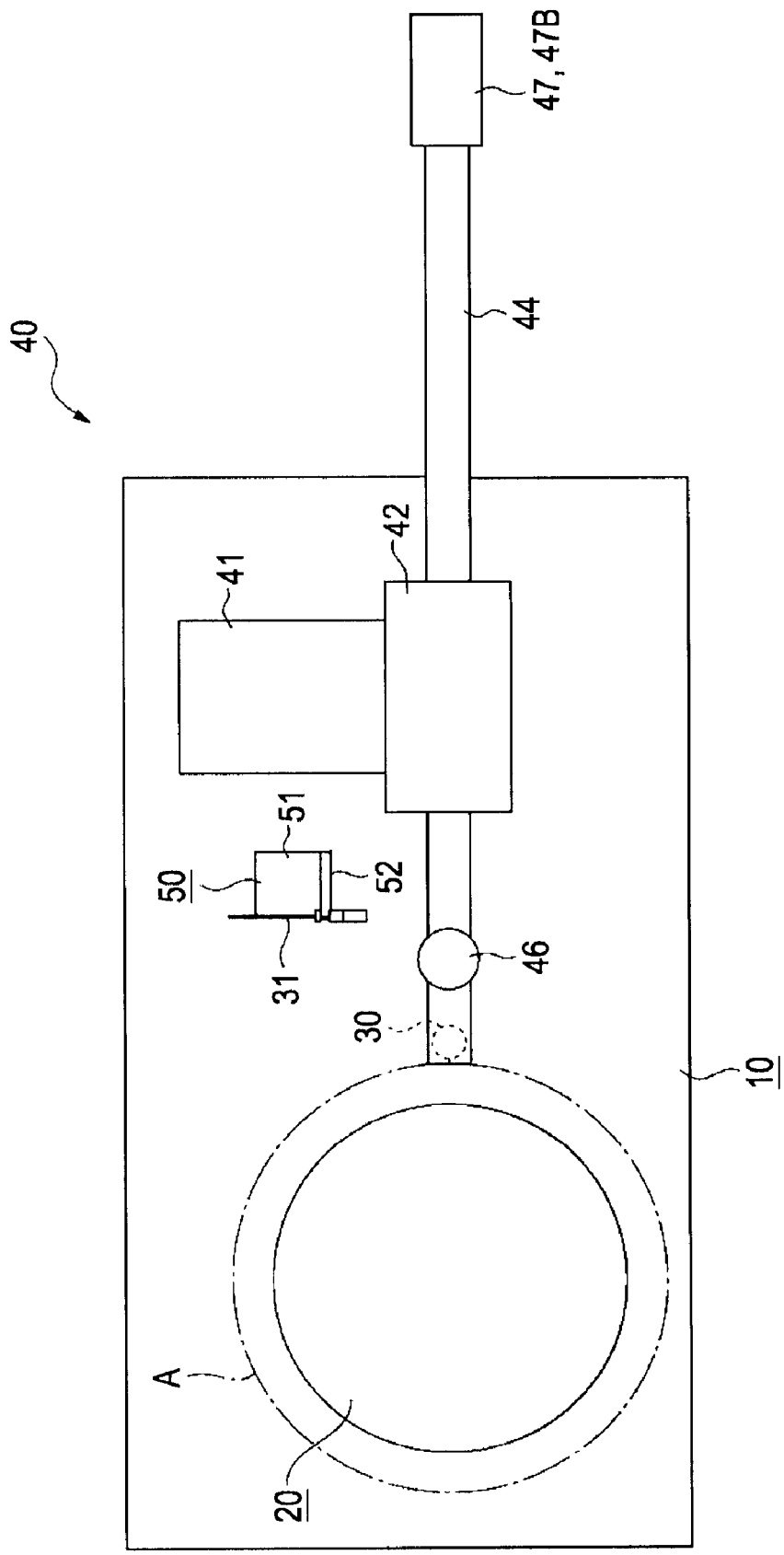
FIG. 2 is a plan view that schematically illustrates an example of the configuration of a roundness measuring apparatus according to an exemplary embodiment of the invention.

The stylus stock unit 50 is provided outside a measurement region (refer to a measurement region A shown in FIG. 6) that is determined on the basis of the rotation area of the turntable 20 and the movement area (i.e., range) of the detector driving mechanism 40. Specifically, as illustrated in FIG. 2, the stylus stock unit 50 is provided at a position between the turntable 20 and the column 41 near the back of the base 10 behind the sliding axis of the sliding arm 44. That is, the sliding axis of the sliding arm 44 is positioned between the stylus stock unit 50 and the front of the base 10. The detector 30 can be moved to the position of the stylus stock unit 50. In the present embodiment of the invention, the detector 30 can be moved to the outside of the measurement region through the operation of the second slide driving mechanism 46 and the swiveling drive mechanism 47.

As illustrated in FIGS. 2 and 5, the stylus stock unit 50 has a stocker main body 51, which is an L-shaped member. The stocker main body 51 is provided at a position between the turntable 20 and the column 41 near the back of the base 10 behind the sliding axis of the sliding arm 44. The stocker main body 51 has an upright piece portion 52. A plurality of stylus holding portions 53 is formed through the upright piece portion 52 at equal or predetermined vertical spaces. Each of the stylus holding portions 53 is formed as a notch that has a substantially half-round shape. The hookable neck portion 31C of the stylus 31 is held in the half-round notch such that the stylus 31 can be taken out of the stylus stock unit 50 and stored in (on) the stylus stock unit 50. Besides a standard stylus 31, styli having lengths different from one another are held on the stylus stock unit 50.

Configuration of Control System

Figure 7:
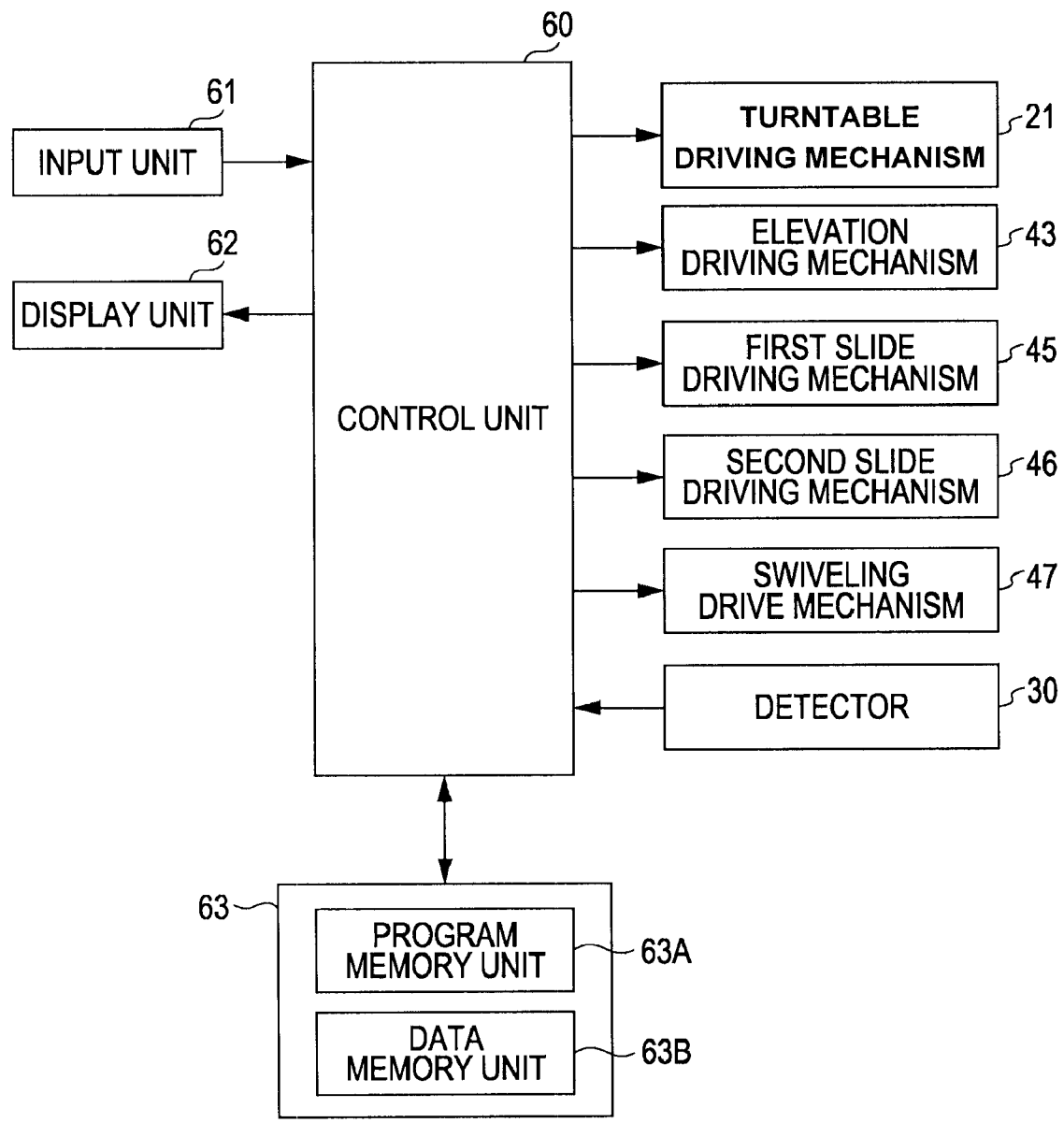
FIG. 7 is a block diagram that schematically illustrates an example of the configuration of a control unit and peripheral mechanisms according to an exemplary embodiment of the invention.

As illustrated in FIG. 7, a control system according to the present embodiment of the invention includes the control unit 60, an input unit 61, a display unit 62, and a memory unit 63. The memory unit 63 includes a program memory unit 63A and a data memory unit 63B. Programs such as a measurement program, an automatic stylus replacement program, and the like are pre-stored in the program memory unit 63A. The data memory unit 63B stores measurement data that is acquired during measurement and other data. The input unit 61, the display unit 62, and the memory unit 63 are connected to the control unit 60. In addition, the turntable driving mechanism 21, the elevation driving mechanism 43, the first slide driving mechanism 45, the second slide driving mechanism 46, the swiveling drive mechanism 47, the detector 30, and the like are connected to the control unit 60. In accordance with the measurement program and the automatic stylus replacement program that are pre-stored in the program memory unit 63A, the control unit 60 controls the driving operation of the turntable driving mechanism 21 and the detector driving mechanism 40. The control unit 60 receives a signal from the detector 30 and processes the received signal. Specifically, when a measurement command is given, the control unit 60 carries out measurement of the roundness, or the like, of the measurement target object W while controlling the driving operation of the turntable driving mechanism 21 and the detector driving mechanism 40. When a stylus replacement command is given, the control unit 60 carries out stylus replacement operation between the detector main unit 32 and the stylus stock unit 50 while controlling the driving operation of the detector driving mechanism 40.

Measurement Operation

When a measurement program that is pre-stored in the program memory unit 63A gives a measurement command to the control unit 60, the detector driving mechanism 40 is operated. That is, the elevation driving mechanism 43 and the first slide driving mechanism 45 perform driving operation to move the detector 30 toward the measurement target object W. The stylus 31 of the detector 30 is brought into contact with the measurement target object W. The turntable 20 is driven for rotation in a state in which the stylus 31 of the detector 30 is in contact with the measurement target object W. The stylus 31 of the detector 30 is displaced depending on the roundness of the measurement target object W. The detector main unit 32 detects the displacement of the stylus 31 and outputs the detected stylus displacement in the form of an electric signal. The electric signal is sent to the control unit 60. The control unit 60 puts the acquired measurement data into the memory of the data memory unit 63B. Then, the control unit 60 calculates roundness on the basis of the memorized data. The result of computation is displayed on the display unit 62. The result is printed out if it is demanded.

Stylus Change Operation

When an automatic stylus replacement program that is pre-stored in the program memory unit 63A gives a stylus replacement command to the control unit 60, the detector driving mechanism 40 is operated. That is, the elevation driving mechanism 43, the first slide driving mechanism 45, the second slide driving mechanism 46, and the swiveling drive mechanism 47 perform driving operation to move the detector 30 for carrying out stylus replacement operation between the detector main unit 32 and the stylus stock unit 50.

When a stylus replacement command is given in a state in which a stylus 30 is attached to the detector main unit 32, as illustrated in FIG. 8, the swiveling drive mechanism 47 performs driving operation to turn the detector 30 by +90°. This means that the detector 30 is put into a horizontal position. Thereafter, the elevation driving mechanism 43 performs driving operation to set the position of the detector 30 at a level (i.e., height) at which a target stylus holding portion 53 of the stylus stock unit 50 is formed. The target stylus holding portion 53 means a stylus holding portion 53 where the stylus 30 is going to be stored. After the leveling operation, the following series of operations is performed.

(A) The second slide driving mechanism 46 performs driving operation to move the detector 30 in the Y− direction. The detector 30 is moved to a position at which the hookable neck portion 31C of the stylus 31 is ready to be held by the stylus holding portion 53 of the stylus stock unit 50.

(B) The first slide driving mechanism 45 performs driving operation to move the detector 30 in the X+ direction. As a result, the stylus 31 is stored into the stylus stock unit 50 with the hookable neck portion 31C being held by the stylus holding portion 53.

(C) The second slide driving mechanism 46 performs driving operation to move the detector 30 in the Y+ direction. As a result, the detector main unit 32 moves in the Y+ direction whereas the stylus 31 remains to be held by the stylus stock unit 50. Therefore, the stylus 31 of the detector 30 is stored in the stylus stock unit 50.

Next, in order to attach a stylus 31, which is not the detached stylus, to the detector main unit 32, the position of the detector main unit 32 is set at a level at which this stylus 31 is stored. After the leveling operation, the following series of operations is performed.

(D) The second slide driving mechanism 46 performs driving operation to move the detector main unit 32 in the Y— direction. As a result, the stylus 31 is inserted onto the detector main unit 32 as a stylus after replacement. That is, the new stylus 31 is attached to the detector main unit 32.

(E) The first slide driving mechanism 45 performs driving operation to move the detector 30 in the X− direction. As a result, the hookable neck portion 31C of the stylus 31 comes free from the stylus holding portion 53 of the stylus stock unit 50.

(F) The second slide driving mechanism 46 performs driving operation to move the detector 30 in the Y+ direction. Therefore, the detector 30 returns to its original position. Then, the swiveling drive mechanism 47 performs driving operation to turn the detector 30 into a vertical position. Thereafter, measurement of a new measurement site is carried out.

Advantageous Effects of Exemplary Embodiment of the Invention (1) When a measurement command is given, the detector driving mechanism 40 performs driving operation to bring the stylus 31 of the detector 30 into contact with the measurement target object W. The turntable 20 is driven for rotation in a state in which the stylus 31 is in contact with the measurement target object W. By this means, measurement of the roundness, or the like, of the measurement target object W is carried out. When a stylus replacement command is given, the detector driving mechanism 40 performs driving operation to carry out stylus replacement operation between the detector main unit 32 and the stylus stock unit 50. Therefore, if it is programmed that a stylus replacement command should be issued depending on the shape of a measurement site of the measurement target object W, stylus replacement operation is carried out automatically between the detector main unit 32 and the stylus stock unit 50, which makes it possible to conduct measurement work continuously without interruption. Thus, a burden placed on a person who carries out measurement can be reduced. In addition, it is possible to increase the efficiency of measurement work.

(2) The stylus stock unit 50 is provided outside the measurement region A, which is determined on the basis of the operation range of the turntable 20 and the detector driving mechanism 40. In addition, the detector driving mechanism 40 is configured to be able to move the detector 30 to the outside of the measurement region A. Therefore, the stylus stock unit 50 does not impose limitations on the measurement region A.

(3) The detector driving mechanism 40 includes the second slide driving mechanism 46, which is provided at the tip of the sliding arm 44 and applies a driving force to the detector 30 so as to slide the detector 30 in the direction orthogonal to the sliding axis of the sliding arm 44, and the swiveling drive mechanism 47, which moves the second slide driving mechanism 46 in a swiveling direction with the sliding axis of the sliding arm 44 being the center of the swiveling movement of the second slide driving mechanism 46. The swiveling drive mechanism 47 performs driving operation to turn the second slide driving mechanism 46 by ninety degrees around the sliding axis of the sliding arm 44, thereby putting the detector 30 into a horizontal position first. Thereafter, the second slide driving mechanism 46 performs driving operation to slide the detector 30 in the direction orthogonal to the sliding axis of the sliding arm 44. As a result, the detector 30 is moved to the position of the stylus stock unit 50, which is provided outside the measurement region A. Therefore, the detector 30 has access to the stylus stock unit 50 provided outside the measurement region A with a comparatively simple configuration without obstructing roundness measurement operation.

(4) The stylus stock unit 50 is provided at a position between the turntable 20 and the column 41 near the back of the base 10 behind the sliding axis of the sliding arm 44. The sliding axis of the sliding arm 44 is positioned between the stylus stock unit 50 and the front of the base 10. Therefore, the view of a person who carries out measurement, which is taken from the front of the base 10, is not blocked thereby. For this reason, s/he can conduct measurement work while observing the work visually.

(5) The position of the detector 30 can be changed within an angular range from −90° to +90°. In this angular range, the erect position of the detector 30 at which the stylus 31 is oriented in the upright direction is taken as 0°. Therefore, for example, if it is configured that stylus replacement operation is carried out when the detector 30 is in the positive ninety-degree position, it is possible to carry out measurement of the roundness of the measurement target object W when the detector 30 is in the negative ninety-degree position. Thus, it is possible to carry out measurement while appropriately changing the angular position of the detector 30 depending on the shape of the measurement target object W.

Variation Examples

The scope of the invention is not limited to the foregoing embodiment. Various modifications, improvements, and the like that are made within a range in which an object of the invention is achieved are encompassed therein. In the foregoing embodiment of the invention, it is explained that the plurality of stylus holding portions 53 is formed through the stocker main body 51. The stylus holding portions 53 are spaced from one another in a vertical line. Each of the stylus holding portions 53 is formed as a notch that has a half-round shape. The plural types of styli 31 are held in horizontal orientation on the stylus holding portions 53. However, the scope of the invention is not limited to such an exemplary configuration and structure. For example, the plurality of stylus holding portions 53 may be spaced from one another in a horizontal line. The plural types of styli 31 may be held in vertical orientation on the stylus holding portions 53.

In the foregoing embodiment of the invention, the detector main unit 32 and the stylus 31 may be detachably attached to each other by means of magnetic attraction. Or, an alternative means other than a magnetic means may be used. For example, the detector main unit 32 and the stylus 31 may be detachably attached to each other by means of air suction. As another example, a plurality of clamping members may be provided on either one of the detector main unit 32 and the stylus 31 whereas a plurality of counterpart members, which is clamped by the plurality of clamping members, may be provided on the other of the detector main unit 32 and the stylus 31.

In the foregoing embodiment of the invention, it is explained that the detector 30 can be moved in the X direction and the Z direction when it is in ordinary orientation. However, the moving direction of the detector 30 is not limited to such an example.

The present invention can be applied to a roundness measuring apparatus that is capable of changing a stylus automatically.

What is claimed is:

1. A roundness measuring apparatus comprising:
a base;
a turning table that can rotate around a vertical axis, a measurement target object being placed on an upper surface of the turning table;
a detector that includes a stylus and a detector main unit, the stylus being brought into contact with the measurement target object, the stylus being detachably attached to the detector main unit, the detector main unit detecting displacement of the stylus and outputting the detected stylus displacement in the form of an electric signal;
a detector driving mechanism that includes a fixed column that is mounted on the base, said detector driving mechanism drives the detector so as to move the detector in a direction of the vertical axis and in a direction orthogonal to the vertical axis toward and away from the turning table;
a stylus stocker that stores plural types of styli, which are prepared corresponding to shapes of measurement sites of the measurement target object, the stylus stocker being able to store the styli in such a manner that each stylus can be held on the stylus stocker and taken out of the stylus stocker; and
a control unit,
wherein the stylus stocker is disposed between the turntable and the column and provided outside a measurement region, which is determined on the basis of an operation range of the turning table and the detector driving mechanism,
the detector driving mechanism is configured to be able to move the detector to the outside of the measurement region,
when a measurement command is given, the control unit carries out measurement of roundness of the measurement target object while controlling operation of the turning table and the detector driving mechanism, and
when a stylus replacement command is given, the control unit carries out stylus replacement operation between the detector main unit and the stylus stocker while controlling operation of the detector driving mechanism.

2. The roundness measuring apparatus according to claim 1, wherein the detector driving mechanism includes, in addition to the column that is provided on the base, an elevation driving mechanism that drives an elevation slider so as to move the elevation slider upward and downward along the column, a first slide driving mechanism that drives a sliding arm so as to move the sliding arm in the direction orthogonal to the vertical axis toward and away from the turning table with respect to the elevation slider, a second slide driving mechanism that is provided at the tip of the sliding arm and causes the detector to slide in a direction orthogonal to a sliding axis of the sliding arm, and a swiveling drive mechanism that causes the second slide driving mechanism to move in a swiveling direction with the sliding axis of the sliding arm being the center of the swiveling movement of the second slide driving mechanism; and the detector can be moved to the outside of the measurement region through the operation of the second slide driving mechanism and the swiveling drive mechanism.

3. The roundness measuring apparatus according to claim 2, wherein the stylus stocker is provided at a position between the turning table and the column near, or relatively close to, the back of the base behind the sliding axis of the sliding arm.

4. The roundness measuring apparatus according to claim 3, wherein the swiveling drive mechanism can change a position of the detector within an angular range from negative ninety degrees to positive ninety degrees; and,
in said angular range, an erect position of the detector at which the stylus is oriented in an upright direction is taken as zero degree.

5. The roundness measuring apparatus according to claim 2, wherein the swiveling drive mechanism can change a position of the detector within an angular range from negative ninety degrees to positive ninety degrees; and,
in said angular range, an erect position of the detector at which the stylus is oriented in an upright direction is taken as zero degree.

6. The roundness measuring apparatus according to claim 1, wherein a swiveling drive mechanism can change a position of the detector within an angular range from negative ninety degrees to positive ninety degrees; and,
in said angular range, an erect position of the detector at which the stylus is oriented in an upright direction is taken as zero degree.

7. A roundness measuring apparatus comprising:
a base;
a turning table that can rotate around a vertical axis, a measurement target object being placed on an upper surface of the turning table;
a detector that includes a stylus and a detector main unit, the stylus being brought into contact with the measurement target object, the stylus being detachably attached to the detector main unit, the detector main unit detecting displacement of the stylus and outputting the detected stylus displacement in the form of an electric signal;
a detector driving mechanism that drives the detector so as to move the detector in a direction of the vertical axis and in a direction orthogonal to the vertical axis toward and away from the turning table;
a stylus stocker that stores plural types of styli, which are prepared corresponding to shapes of measurement sites of the measurement target object, the stylus stocker being able to store the styli in such a manner that each stylus can be held on the stylus stocker and taken out of the stylus stocker; and
a control unit,
wherein the stylus stocker is provided outside a measurement region, which is determined on the basis of an operation range of the turning table and the detector driving mechanism,
the detector driving mechanism is configured to be able to move the detector to the outside of the measurement region,
when a measurement command is given, the control unit carries out measurement of roundness of the measurement target object while controlling operation of the turning table and the detector driving mechanism, and
when a stylus replacement command is given, the control unit carries out stylus replacement operation between the detector main unit and the stylus stocker while controlling operation of the detector driving mechanism,
wherein the detector driving mechanism includes a column that is provided on the base, an elevation driving mechanism that drives an elevation slider so as to move the elevation slider upward and downward along the column, a first slide driving mechanism that drives a sliding arm so as to move the sliding arm in the direction orthogonal to the vertical axis toward and away from the turning table with respect to the elevation slider, a second slide driving mechanism that is provided at the tip of the sliding arm and causes the detector to slide in a direction orthogonal to a sliding axis of the sliding arm, and a swiveling drive mechanism that causes the second slide driving mechanism to move in a swiveling direction with the sliding axis of the sliding arm being the center of the swiveling movement of the second slide driving mechanism; and the detector can be moved to the outside of the measurement region through the operation of the second slide driving mechanism and the swiveling drive mechanism.

8. The roundness measuring apparatus according to claim 7, wherein the stylus stocker is provided at a position between the turning table and the column near, or relatively close to, the back of the base behind the sliding axis of the sliding arm.

9. The roundness measuring apparatus according to claim 8, wherein the swiveling drive mechanism can change a position of the detector within an angular range from negative ninety degrees to positive ninety degrees; and,
in said angular range, an erect position of the detector at which the stylus is oriented in an upright direction is taken as zero degree.

10. The roundness measuring apparatus according to claim 7, wherein the swiveling drive mechanism can change a position of the detector within an angular range from negative ninety degrees to positive ninety degrees; and,
in said angular range, an erect position of the detector at which the stylus is oriented in an upright direction is taken as zero degree.

11. A roundness measuring apparatus comprising:
a base;
a turning table that can rotate around a vertical axis, a measurement target object being placed on an upper surface of the turning table;
a detector that includes a stylus and a detector main unit, the stylus being brought into contact with the measurement target object, the stylus being detachably attached to the detector main unit, the detector main unit detecting displacement of the stylus and outputting the detected stylus displacement in the form of an electric signal;
a detector driving mechanism that drives the detector so as to move the detector in a direction of the vertical axis and in a direction orthogonal to the vertical axis toward and away from the turning table;
a stylus stocker that stores plural types of styli, which are prepared corresponding to shapes of measurement sites of the measurement target object, the stylus stocker being able to store the styli in such a manner that each stylus can be held on the stylus stocker and taken out of the stylus stocker; and
a control unit,
wherein the stylus stocker is provided outside a measurement region, which is determined on the basis of an operation range of the turning table and the detector driving mechanism,
the detector driving mechanism is configured to be able to move the detector to the outside of the measurement region, when a measurement command is given, the control unit carries out measurement of roundness of the measurement target object while controlling operation of the turning table and the detector driving mechanism, and when a stylus replacement command is given, the control unit carries out stylus replacement operation between the detector main unit and the stylus stocker while controlling operation of the detector driving mechanism, wherein a swiveling drive mechanism can change a position of the detector within an angular range from negative ninety degrees to positive ninety degrees; and, in said angular range, an erect position of the detector at which the stylus is oriented in an upright direction is taken as zero degree.

* * * * *